United States Patent
Yim et al.

(10) Patent No.: US 11,367,414 B2
(45) Date of Patent: Jun. 21, 2022

(54) CONTENT SCHEDULING APPARATUS AND METHOD

(71) Applicant: SAMSUNG SDS CO., LTD., Seoul (KR)

(72) Inventors: Ji Hoon Yim, Seoul (KR); Sung Tae Kim, Seoul (KR); Hyun Min Kim, Seoul (KR)

(73) Assignee: SAMSUNG SDS CO, LTD., Seoul (KR)

(*) Notice: Subject to any disclaimer, the term of this patent is extended or adjusted under 35 U.S.C. 154(b) by 0 days.

(21) Appl. No.: 16/761,646

(22) PCT Filed: Mar. 21, 2019

(86) PCT No.: PCT/KR2019/003314
§ 371 (c)(1),
(2) Date: May 5, 2020

(87) PCT Pub. No.: WO2019/231087
PCT Pub. Date: Dec. 5, 2019

(65) Prior Publication Data
US 2021/0183337 A1    Jun. 17, 2021

(30) Foreign Application Priority Data

May 30, 2018 (KR) .......... 10-2018-0062176

(51) Int. Cl.
*G09G 5/14* (2006.01)
*G09G 5/38* (2006.01)

(52) U.S. Cl.
CPC ............. *G09G 5/14* (2013.01); *G09G 5/38* (2013.01); *G09G 2320/08* (2013.01); *G09G 2320/10* (2013.01); *G09G 2380/06* (2013.01)

(58) Field of Classification Search
CPC ........ G09G 5/14; G09G 5/38; G09G 2320/08; G09G 2320/10; G09G 2380/06
See application file for complete search history.

(56) References Cited

U.S. PATENT DOCUMENTS

2003/0067418 A1* 4/2003 McClintock .......... G06F 1/1605
345/1.1
2004/0051703 A1* 3/2004 Taniguchi ............... G06F 16/58
707/E17.026

(Continued)

FOREIGN PATENT DOCUMENTS

CN    102542949 A    7/2012
KR    10-0662450 B1   1/2007

(Continued)

OTHER PUBLICATIONS

International Search Report for PCT/KR2019/003314 dated Jul. 3, 2019.

*Primary Examiner* — Terrell M Robinson
(74) *Attorney, Agent, or Firm* — The PL Law Group, PLLC

(57) ABSTRACT

A content scheduling apparatus includes a content storage storing contents, a screen division information storage storing screen division information including a screen division form having division regions and time slot information including information about time slots allocated to each of the division regions, a content information storage storing content information including content list information about a list in which contents are listed for each of the division regions among the contents and content display order information including display orders each of which includes a display order of the contents listed for each of the division regions, and a schedule generator to allocate the contents listed for each of the division regions to the time slots allocated to each of the division regions according to the (Continued)

content display order information so that the contents listed for each of the division regions are sequentially displayed on each of the division regions.

9 Claims, 10 Drawing Sheets

(56) References Cited

U.S. PATENT DOCUMENTS

| | | | |
|---|---|---|---|
| 2009/0055766 A1 | 2/2009 | Young et al. | |
| 2009/0276778 A1* | 11/2009 | Ringseth | G06F 9/4881 |
| | | | 718/102 |
| 2012/0327110 A1* | 12/2012 | Kang | G06Q 50/01 |
| | | | 345/620 |
| 2014/0092038 A1* | 4/2014 | Ichinowatari | G06F 3/04886 |
| | | | 345/173 |
| 2015/0220493 A1* | 8/2015 | Hayashi | G06F 40/106 |
| | | | 715/202 |
| 2015/0269315 A1* | 9/2015 | Arakita | A61B 5/7445 |
| | | | 382/131 |
| 2019/0250759 A1* | 8/2019 | Chung | G06F 3/0488 |

FOREIGN PATENT DOCUMENTS

| | | |
|---|---|---|
| KR | 10-2015-0077057 A | 7/2015 |
| KR | 10-1695931 B1 | 1/2017 |
| KR | 102111169 B1 * | 5/2020 |

* cited by examiner

FIG. 3

| | | | | | | | | | | | | |
|---|---|---|---|---|---|---|---|---|---|---|---|---|
| A | AX1 | AX2 | AX3 | AX4 | AX5 | AX6 | AX7 | AX8 | AX9 | AX10 | AX11 | AX12 |
| | AY1 | AY2 | AY3 | AY4 | AY5 | AY6 | AY7 | AY8 | AY9 | AY10 | AY11 | AY12 |
| | AZ1 | AZ2 | AZ3 | AZ4 | AZ5 | AZ6 | AZ7 | AZ8 | AZ9 | AZ10 | AZ11 | AZ12 |

| | | | | | | | | | | | | |
|---|---|---|---|---|---|---|---|---|---|---|---|---|
| B | BX1 | BX2 | BX3 | BX4 | BX5 | BX6 | BX7 | BX8 | BX9 | BX10 | BX11 | BX12 |
| | BY1 | BY2 | BY3 | BY4 | BY5 | BY6 | BY7 | BY8 | BY9 | BY10 | BY11 | BY12 |

| | | | | | | | | | | | | |
|---|---|---|---|---|---|---|---|---|---|---|---|---|
| C | CX1 | CX2 | CX3 | CX4 | CX5 | CX6 | CX7 | CX8 | CX9 | CX10 | CX11 | CX12 |
| | CY1 | CY2 | CY3 | CY4 | CY5 | CY6 | CY7 | CY8 | CY9 | CY10 | CY11 | CY12 |
| | CZ1 | CZ2 | CZ3 | CZ4 | CZ5 | CZ6 | CZ7 | CZ8 | CZ9 | CZ10 | CZ11 | CZ12 |

| A | B | C | A | B | C | A | B | C | A | B | C |
|---|---|---|---|---|---|---|---|---|---|---|---|
| AX1 | BX1 | CX1 | AX2 | BX2 | CX2 | AX3 | BX3 | CX3 | AX4 | BX4 | CX4 |
| AY1 | BY1 | CY1 | AY2 | BY2 | CY2 | AY3 | BY3 | CY3 | AY4 | BY4 | CY4 |
| AZ1 |     | CZ1 | AZ2 |     | CZ2 | AZ3 |     | CZ3 | AZ4 |     | CZ4 |

| A | | B | | C | | A | | B | | C | |
|---|---|---|---|---|---|---|---|---|---|---|---|
| AX1 | AX2 | BX1 | BX2 | CX1 | CX2 | AX3 | AX4 | BX3 | BX4 | CX3 | CX4 |
| AY1 | AY2 | BY1 | BY2 | CY1 | CY2 | AY3 | AY4 | BY3 | BY4 | CY3 | CY4 |
| AZ1 | AZ2 | | | CZ1 | CZ2 | AZ3 | AZ4 | | | CZ3 | CZ4 |

FIG. 6

| DIVISION REGION | CONTENT |
|---|---|
| AX | C1(1), C2(2), C3(3), C4(4) |
| AY | C5(1) |
| AZ | C6(1) |
| BX | C7(1), C8(2), C9(3) |
| BY | C10(1), C11(2) |
| CX | C12(1), C13(2), C14(3) |
| CY | C15(1), C16(2), C17(3) |
| CZ | C18(1), C19(2), C20(3) |

| A | C1 | C2 | C3 | C4 | DC | DC | DC | DC | DC | DC | DC |
|---|----|----|----|----|----|----|----|----|----|----|----|
|   | C5 | DC | DC | DC | DC | DC | DC | DC | DC | DC | DC |
|   | C6 | DC | DC | DC | DC | DC | DC | DC | DC | DC | DC |

| B | C7 | C8 | C9 | DC | DC | DC | DC | DC | DC | DC | DC |
|---|----|----|----|----|----|----|----|----|----|----|----|
|   | C10 | C11 | DC | DC | DC | DC | DC | DC | DC | DC | DC |

| C | C12 | C13 | C14 | DC | DC | DC | DC | DC | DC | DC | DC |
|---|-----|-----|-----|----|----|----|----|----|----|----|----|
|   | C15 | C16 | C17 | DC | DC | DC | DC | DC | DC | DC | DC |
|   | C18 | C19 | C20 | DC | DC | DC | DC | DC | DC | DC | DC |

CONTENT SCHEDULING APPARATUS AND METHOD

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/003314 filed on Mar. 21, 2019, which claims priority to the benefit of Korean Patent Application No. 10-2018-0062176 filed in the Korean Intellectual Property Office on May 30, 2018, the entire contents of which are incorporated herein by reference.

TECHNICAL FIELD

The disclosed embodiments relate to content scheduling technology.

BACKGROUND ART

With developments in display technology and network technology, outdoor advertising using various forms of digital signage, such as a video wall and a kiosk, is becoming a new trend in the advertising industry. With recent development of display technology, a display screen is divided into a plurality of division regions, and the plurality of contents are displayed for respective division regions.

Here, in order for the plurality of contents to be displayed in respective division regions, the plurality of contents need to be allocated to the respective division regions, but the allocating of the plurality of contents has numerous difficulties. In detail, when a list of contents to be displayed in each division region is organized, there is difficulty in grouping the organization units or inconvenience in generating a playback list for each screen one by one. In addition, when a list of contents to be displayed in each division region is incorrectly organized, a screen transition between division regions is not smooth, and in the case of a method of interoperating with an external system, a great deal of limitations and inconveniences exist in establishing a criterion for determining whether a specific part is to be associated with the outside.

Accordingly, there is a need for a content scheduling method capable of easily and rationally organizing a list of contents to be displayed in each division region.

The present invention is directed to providing a content scheduling apparatus and method.

One aspect of the present invention provides a content scheduling apparatus including a content storage configured to store plurality of contents, a screen division information storage configured to store screen division information including a plurality of screen division forms including different respective division regions and time slot information allocated to each of the division regions included in each of the plurality of screen division forms, a content information storage configured to store content information including content list information including a list of contents that are to be displayed in each of the division regions among the plurality of contents and content display order information including a display order of contents that are to be displayed in each of the division regions, and a schedule generator configured to allocate the plurality of contents to time slots allocated to each of the division regions based on the screen division information and the content information to generate a content display schedule. The screen division information may further include information about a switching order between the plurality of screen division forms and display duration of each of the plurality of screen division forms.

The content scheduling apparatus may further include a display controller configured to control a display screen to be divided based on the screen division information and control the plurality of contents to be displayed in the respective division regions based on the content display schedule.

The schedule generator may allocate the plurality of contents to the time slots allocated to each of the division regions based on the time slot information and the content list information such that the plurality of contents are sequentially allocated based on the content display order information.

When the number of the plurality of contents to be displayed in a specific division region among the respective division regions is less than the number of the time slots allocated to the specific division region, the schedule generator may sequentially and repeatedly allocate the plurality of contents that are to be displayed in the specific division region to the time slots allocated to the specific division region.

When the number of the plurality of contents to be displayed in a specific division region among the respective division regions is less than the number of the time slots allocated to the specific division region, the schedule generator may allocate the plurality of contents that are to be displayed in the specific division region to the time slots allocated to the specific division region and allocate predetermined default content to a time slot to which no content is allocated.

One aspect of the present invention provides a content scheduling method performed by a content scheduling apparatus, including storing plurality of contents, storing screen division information including a plurality of screen division forms including different respective division regions and time slot information allocated to each of the division regions included in each of the plurality of screen division forms, storing content information including content list information including a list of contents that are to be displayed in each of the division regions among the plurality of contents and content display order information including a display order of contents that are to be displayed in each of the division regions, and allocating the plurality of contents to time slots allocated to each of the division regions based on the screen division information and the content information to generate a content display schedule.

The screen division information may further include information about a switching order between the plurality of screen division forms and display duration of each of the plurality of screen division forms.

The content scheduling method may further include controlling a display screen to be divided based on the screen division information and controlling the plurality of contents to be displayed in the respective division regions based on the content display schedule.

The generating of the content display schedule may include allocating the plurality of contents to the time slots allocated to each of the division regions based on the time slot information and the content list information such that the plurality of contents are sequentially allocated based on the content display order information.

The generating of the content display schedule may include, when the number of the plurality of contents to be displayed in a specific division region among the respective division regions is less than the number of the time slots allocated to the specific division region, sequentially and repeatedly allocating the plurality of contents that are to be displayed in the specific division region to the time slots allocated to the specific division region.

The generating of the content display schedule may include, when the number of the plurality of contents to be displayed in a specific division region among the respective division regions is less than the number of the time slots allocated to the specific division region, allocating the plurality of contents that are to be displayed in the specific division region to the time slots allocated to the specific division region and allocating predetermined default content to a time slot to which no content is allocated.

According to the disclosed embodiments, when a display screen is divided into a plurality of division forms, independent organization of the plurality of contents is performable based on each divided region included in each division form.

Since the independence of content organization for each division region is ensured, the content organization for each division region is easily interoperated with an external system, such as an advertisement sales system, so that the division regions can be more effectively utilized.

BRIEF DESCRIPTION OF THE DRAWINGS

FIG. 3 is an exemplary diagram illustrating an example of time slots allocated to respective division regions.

FIG. 4 is an exemplary diagram illustrating another example of time slots allocated to respective division regions.

FIG. 5 is an exemplary diagram illustrating still another example of time slots allocated to respective division regions.

FIG. 6 is an exemplary diagram illustrating an example of content information according to an embodiment.

FIG. 7 is an exemplary diagram illustrating a content allocation process according to an embodiment.

FIG. 8 is an exemplary diagram illustrating a content allocation process according to another embodiment.

DETAILED DESCRIPTION

Figure 1:
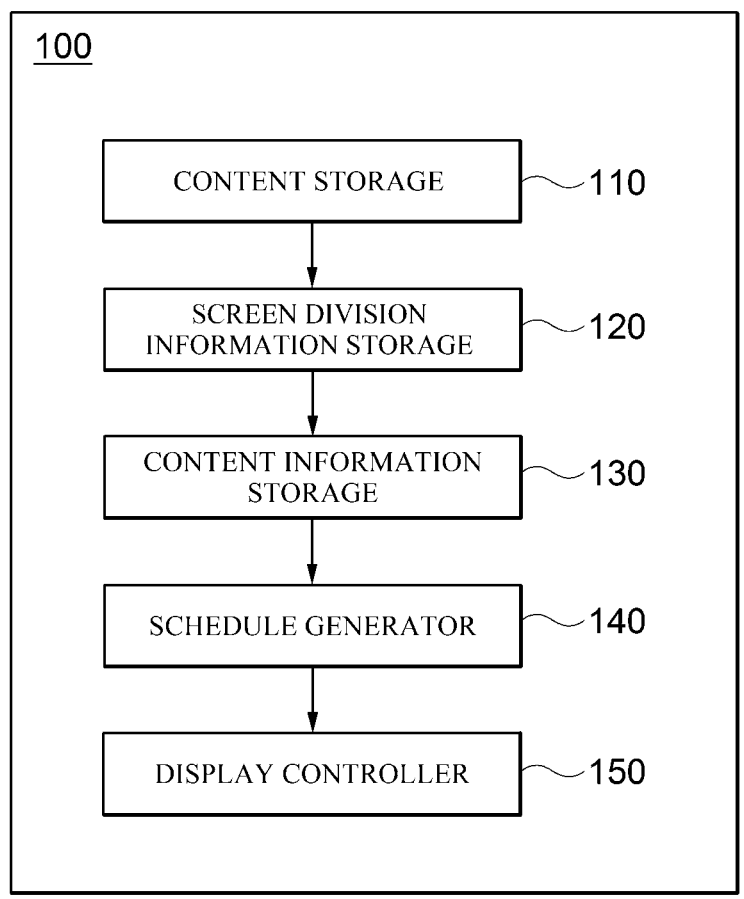
FIG. 1 is a block diagram illustrating a content scheduling apparatus according to an embodiment.

Hereinafter, embodiments of the present invention will be described in detail with reference to the accompanying drawings. In the drawings, parts similar or identical to each other throughout the drawings will be assigned the same number, and redundant descriptions thereof will be omitted. The suffixes for elements used in the following description "module," "part," and "unit" have only been assigned or used together in consideration of the ease of drafting and do not distinguish meanings or roles therebetween. In the description of the embodiments, detailed descriptions of related known techniques will be omitted to avoid obscuring the subject matter of the present disclosure. In addition, the accompanying drawings are used to aid in the understanding of the embodiments of the present invention and are not intended to limit the technical spirit of the present invention, and the accompanying drawings cover all modifications, equivalents, and alternatives falling within the spirit and scope of the present invention.

It should be understood that, although terms including ordinal numbers, such as first, second, etc., may be used herein to describe various elements, these elements are not limited by these terms. These terms are only used to distinguish one element from another element.

It should be understood that, when an element is referred to as being "connected to" or "coupled to" another element, the element can be directly connected or coupled to another element, or intervening elements may be present. Conversely, when an element is referred to as being "directly connected to" or "directly coupled to" another element, there are no intervening elements present.

As used herein, the singular forms "a," "an," and "the" are intended to include the plural forms as well, unless the context clearly indicates otherwise.

It should be further understood that the terms "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, embodiments of the present invention will be described in detail with reference to the drawings. A person having ordinary skills in the art should appreciate that other specific modifications can be easily made without departing from the technical spirit or essential features of the invention.

FIG. 1 is a block diagram illustrating a content scheduling apparatus 100 according to an embodiment.

As shown in FIG. 1, the content scheduling apparatus 100 includes a content storage 110, a screen division information storage 120, a content information storage 130, and a schedule generator 140. The content scheduling apparatus 100 according to another embodiment may further include a display controller 150.

The content storage 110 stores plurality of contents. Content refers to digital information such as a video or image that may be displayed in a display screen.

The screen division information storage 120 stores screen division information about a display screen on which plurality of contents are to be displayed. The screen division information includes information about a plurality of screen division forms including different respective division regions, time slots allocated to each of the division regions included in each of the plurality of screen division forms, a switching order between the plurality of screen division forms, and display duration of each of the plurality of screen division forms.

A time slot refers to a time interval for which a single piece of content is displayed in each division region, and the number of the time slots allocated to each division region and the length of the time slot may vary according to a user's setting.

The content information storage 130 stores content information. The content information may include content list information including a list of contents to be displayed in each division region among the plurality of contents and content display order information including a display order of contents to be displayed in each division region.

The schedule generator 140 generates a content display schedule by allocating the plurality of contents to the time slots allocated to each division region based on the screen division information and the content information. In detail, the schedule generator 140 allocates the plurality of contents to time slots allocated to each of the division regions based on the time slot information and the content list information included in the screen division information and the content information in a sequence based on the content display order information included in the content information.

The display controller 150 may control the display screen to be divided based on the screen division information and control the plurality of contents to be displayed in the respective division regions based on the content display schedule.

Figure 2:
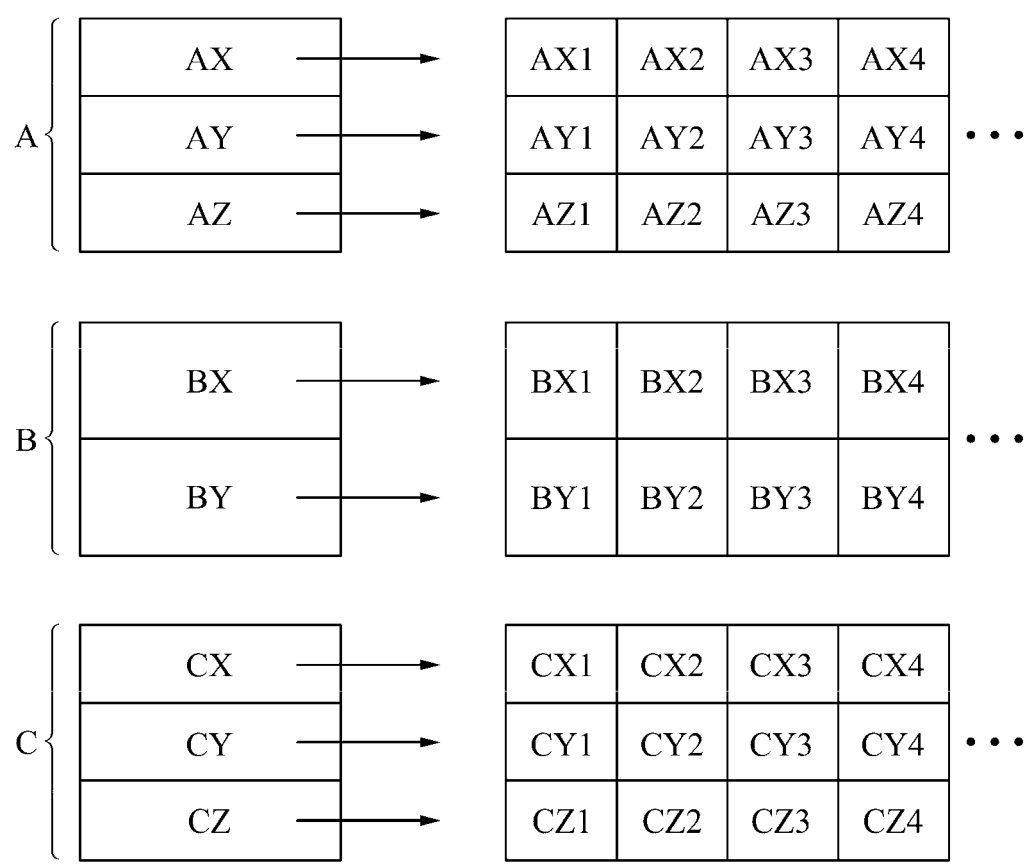
FIG. 2 is an exemplary diagram for describing a screen division form and a time slot according to an embodiment.

FIG. 2 is an exemplary diagram for describing a screen division form and a time slot according to an embodiment.

Referring to FIG. 2, in the illustrated examples, A, B, and C represent screen division forms for the display screen. The display screen may be divided into an AX region, an AY region, and an AZ region, divided into a BX region and a BY region, or divided into a CX region, a CY region, and a CZ region according to screen division forms.

Meanwhile, time slots are allocated to each of the division regions included in each screen division form. In the specific embodiment shown in FIG. 2, the AX region may have an AX1 time slot, an AX2 time slot, an AX3 time slot, an AX4 time slot, . . . , and the like allocated thereto, and the AY region may have an AY1 time slot, an AY2 time slot, an AY3 time slot, an AY4 time slot, . . . , and the like allocated thereto, and the AZ region may have an AZ1 time slot, an AZ2 time slot, an AZ3 time slot, an AZ4 time slot, . . . , and the like allocated thereto. The division regions BX, BY, CX, CY, and CZ are also subject to time slot allocation in the same manner as in the AX, AY, and AZ. One piece of content may be allocated to each time slot.

FIG. 3 is an exemplary diagram illustrating an example of time slots allocated to respective division regions.

In detail, FIG. 3 illustrates an example of the time slots of division regions included in each screen division form shown in FIG. 2.

Referring to FIG. 3, the switching between the screen division forms A, B, and C in the illustrated example may be implemented in the order of A, B, and C. In this case, the display screen may be alternately divided in the order of the screen division form of A, the screen division form of B, and the screen division form of C.

On the other hand, the display duration may be set for each of the screen division forms A, B, and C. For example, the display duration for each of the screen division forms A, B, and C may be set to 12 minutes. In this case, each time slot (i.e., each of AX1 to AX12, AY1 to AY12, AZ1 to AZ12, BX1 to BX12, BY1 to BY12, CX1 to CX12, CY1 to CY12, and CZ1 to CZ12) may have a time interval of one minute.

In this case, the display screen maintains the screen division form A for 12 minutes, and the plurality of contents allocated to time slots allocated to the respective AX, AY, and AZ regions are displayed in the AX, AY, and AZ regions. For the next 12 minutes, the display screen maintains the screen division form B, and the plurality of contents allocated to time slots allocated to the respective BX and BY regions are displayed in the BX and BY regions. For the next 12 minutes, the display screen maintains the screen division form C, and the plurality of contents allocated to time slots allocated to the respective CX, CY, and CZ regions are displayed in the CX, CY, and CZ regions. For the next 12 minutes, the display screen maintains the screen division form A, and the above process may be repeated over time.

Meanwhile, the switching order between the plurality of screen division forms and the display duration for each of the plurality of screen division forms may vary according to a user's setting. The number and the time intervals of the time slots may also vary according to a user's setting.

FIG. 4 is an exemplary diagram illustrating another example of time slots allocated to respective division regions.

In detail, FIG. 4 illustrates another example of the time slots of division regions included in each screen division form shown in FIG. 2.

Referring to FIG. 4, the switching between the screen division forms A, B, and C in the illustrated example is implemented in the order of A, B, and C.

Meanwhile, the display duration of each of the screen division forms A, B, and C may be set to 1 minute. In this case, the display screen maintains the screen division form A for one minute, and the plurality of contents allocated to the AX1, AY1, and AZ1 time slots are displayed in the AX, AY, and AZ regions. For the next one minute, the display screen maintains the screen division form B, and the plurality of contents allocated to the BX1 and BY1 time slots are displayed in the BX and BY regions. For the next one minute, the display screen maintains the division screen form C, and the plurality of contents allocated to the CX1, CY1, and CZ1 time slots are displayed in the CX, CY, and CZ regions.

For the next one minute, the display screen maintains the division screen form A, and the plurality of contents allocated to the AX2, AY2 and AZ2 time slots are displayed in the AX, AY and AZ regions. For the next one minute, the display screen maintains the screen division form B, and the plurality of contents allocated to the BX2 and BY2 time slots are displayed in the BX and BY regions. For the next one minute, the display screen maintains the division screen form C, and the plurality of contents allocated to the CX2, CY2 and CZ2 time slots are displayed in the CX, CY, and CZ regions. For the next one minute, the display screen maintains the screen division form A, and the above process may be repeated over time.

FIG. 5 is an exemplary diagram illustrating still another example of time slots allocated to respective division regions.

In detail, FIG. 5 illustrates another example of the time slots of the division regions included in the screen division forms shown in FIG. 2.

Referring to FIG. 5, the switching between the screen division forms A, B, and C in the illustrated example is implemented in the order of A, B, and C. On the other hand, the display duration of each of the screen division form A, B, and C may be set to two minutes. In this case, the display screen maintains the division screen form A for two minutes, and in the AX, AY and AZ regions, the plurality of contents allocated to the AX1, AY1, and AZ1 time slots are displayed for one minute, and the plurality of contents allocated to the AX2, AY2, and AZ2 time slots are displayed for one minute. For the next two minutes, the display screen maintains the division screen form B, and in the BX and BY regions, the plurality of contents allocated to the BX1 and BY1 time slot are displayed for one minute, and the plurality of contents allocated to BX2 and BY2 time slots are displayed for one minute. For the next two minutes, the display screen maintains the division form C, and in the CX, CY, and CZ regions, the plurality of contents allocated to the CX1, CY1, and CZ1 time slots are displayed for one minute, and the plurality of contents allocated to the CX2, CY2, and CZ2 time slots are displayed for one minute.

In the following one minute, the display screen maintains the division screen form A for two minutes, and in the AX, AY and AZ regions, the plurality of contents allocated to the AX3, AY3, and AZ3 time slots are displayed for one minute, and the plurality of contents allocated to the AX4, AY4, and AZ4 time slots are displayed for one minute. For the next two minutes, the display screen maintains the screen division screen form B, and in the BX and BY regions, the plurality of contents allocated to the BX3 and BY3 time slot are displayed for one minute, and the plurality of contents allocated to the BX4 and BY4 time slots are displayed for one minute. For the next two minutes, the display screen maintains the screen division form C, and in the CX, CY, and CZ regions, the plurality of contents allocated to the CX3, CY3, and CZ3 time slots are displayed for one minute, and the plurality of contents allocated to the CX4, CY4, and CZ4 time slots are displayed for one minute. For the next two minutes, the display screen maintains the division screen form A, and the above process may be repeated over time.

FIG. 6 is an exemplary diagram illustrating an example of content information according to an embodiment.

The content information according to the embodiment may include content list information and content display order information. The content list information includes a list of contents to be displayed in each division region. The content display order information includes a display order of contents to be displayed in each division region.

On the other hand, in the example shown in FIG. 6, C1 to C20 denote respective pieces of identification information of content, and the number contained in parentheses next to the identification information of the content represents the display order of the content in each division regions.

In detail, the content information corresponding to the AX region includes C1(1), C2(2), C3(3), and C4(4), and the content information corresponding to the AY region includes C5(1), and the content information corresponding to the AZ region includes C6(1). The content information corresponding to the BX region includes C7(1), C8(2), and C9(3), and the content information corresponding to the BY region includes C10(1) and C11(2). The content information corresponding to the CX region includes C12(1), C13(2), and C14(3), and the content information corresponding to the CY region includes C15(1), C16(2), and C17(3), and the content information corresponding to the CZ region includes C18(1), C19(2), and C20(3).

Here, the including of C1(1), C2(2), C3(3), and C4(4) in the content information corresponding to the AX region refers to sequentially allocating C1, C2, C3, and C4 to time slots allocated to the AX region.

Figure 7:
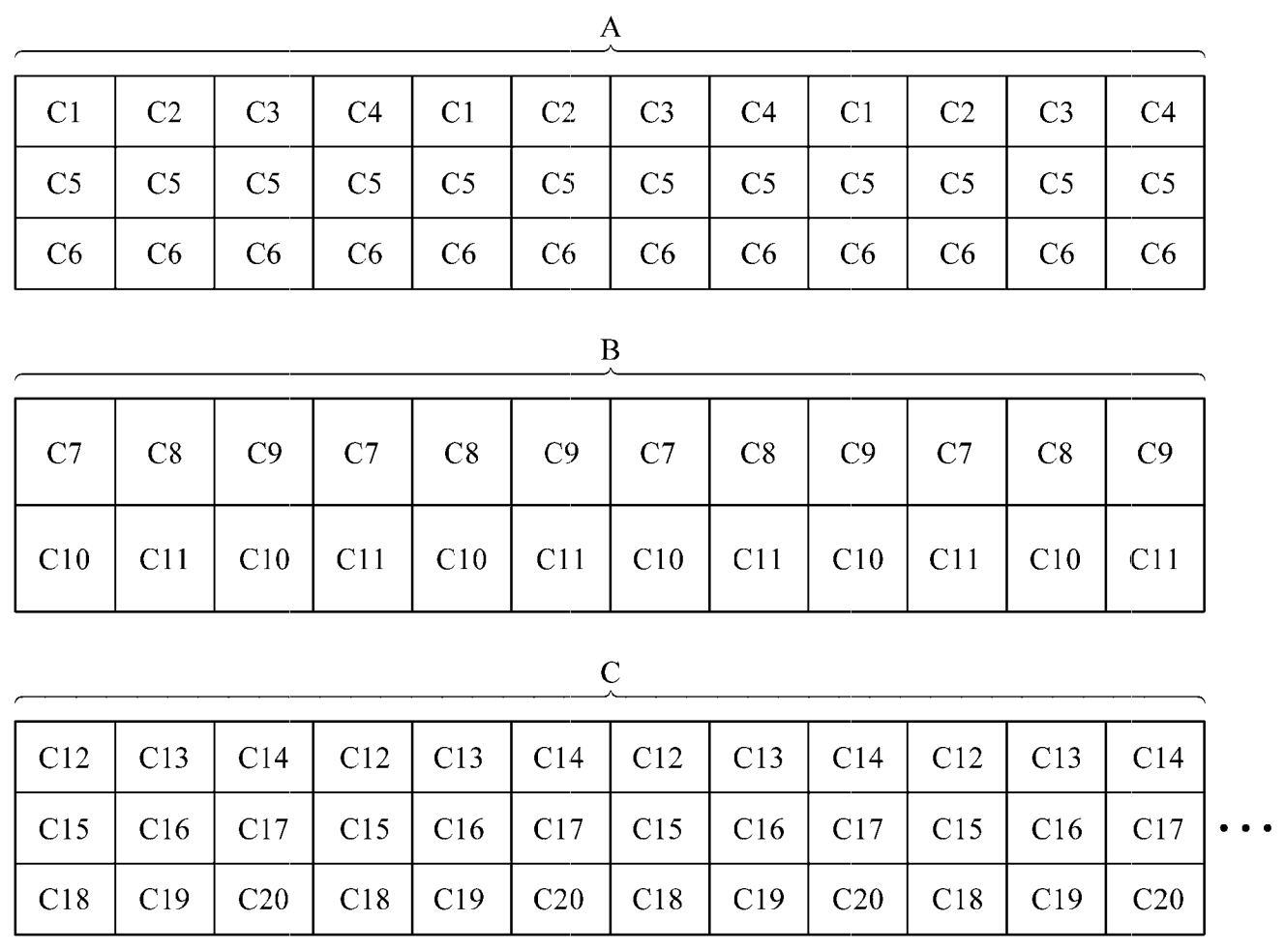

FIG. 7 is an exemplary diagram illustrating a content allocation process according to an embodiment.

The schedule generator 140 may allocate plurality of contents to time slots allocated to division regions based on the time slot information and the content list information such that the plurality of contents are sequentially allocated based on the content display order information. When the number of the plurality of contents to be displayed in a specific division region among the respective division regions is less than the number of the time slots allocated to the specific division region, the schedule generator 140 may sequentially and repeatedly allocate the plurality of contents to be displayed in the specific division region to the time slots allocated to the specific division region. FIG. 7 illustrates that the plurality of contents are sequentially and repeatedly allocated to the time slots shown in FIG. 3 based on the content information shown in FIG. 6. Accordingly, hereinafter, FIG. 7 will be described based on the time slots shown in FIG. 3.

In detail, C1 to C4 are sequentially and repeatedly allocated to the time slots AX1 to AX12 allocated to the AX region. C5 is repeatedly allocated to the time slots AY1 to AY12 allocated to the AY region, and C6 is repeatedly allocated to the time slots AZ1 to AZ12 allocated to the AZ region. C7 to C9 are sequentially and repeatedly allocated to the time slots BX1 to BX12 allocated to the BX region, and C10 and C11 are sequentially and repeatedly allocated to the time slots BY1 to BY12 allocated to the BY region. C12 to C14 are sequentially and repeatedly allocated to the time slots CX1 to CX12 allocated to the CX region, C15 to C17 are sequentially and repeatedly allocated to the time slots CY1 to CY12 allocated to the CY region, and C18 to C20 are sequentially and repeatedly allocated to time slots CZ1 to CZ12 allocated to the CZ region.

FIG. 8 is an exemplary diagram illustrating a content allocation process according to another embodiment.

When the number of plurality of contents to be displayed in a specific division region among the division regions is less than the number of time slots allocated to the specific division region, the schedule generator 140 may allocate the plurality of contents to be displayed in the specific division region to the time slots allocated to the specific division region and may allocate predetermined default content to the time slots to which no content is allocated. FIG. 8 illustrates that the plurality of contents are sequentially allocated to the time slots shown in FIG. 3 based on the content information shown in FIG. 6, and then default content is allocated to the time slots to which no content is allocated. Accordingly, hereinafter, FIG. 7 will be described based on the time slots shown in FIG. 3.

In detail, C1 is allocated to the AX1 time slot, C2 is allocated to the AX2 time slot, C3 is allocated to the AX3 time slot, C4 is allocated to the AX4 time slot, C5 is allocated to the AY1 time slot, and C6 is allocated to the AZ1 time slot. C7 is allocated to the BX1 time slot, C8 is allocated to the BX2 time slot, C9 is allocated to the BX3 time slot, C10 is allocated to the BY1 time slot, and C11 is allocated to the BY2 time slot. C12 is allocated to the CX1 time slot, C13 is allocated to the CX2 time slot, C14 is allocated to the CX3 time slot, C15 is allocated to the CY1 time slot, C16 is allocated to the CY2 time slot, C17 is allocated to the CY3 time slot, C18 is allocated to the CZ1 time slot, C19 is allocated to the CZ2 time slot, and C20 is allocated to the CZ3 time slot.

Default content (DC) is allocated to the AX5 to AX12 time slots, the AY2 to AY12 time slots, the AZ2 to AZ12 time slots, the BX4 to BX12 time slots, the BY3 to BY12 time slots, the CX4 to CX12 time slots, the CY4 to CY12 time slots, and the CZ4 to CZ12 time slots. The DC for each division region and each time slot may vary according to a user's setting.

Figure 9:
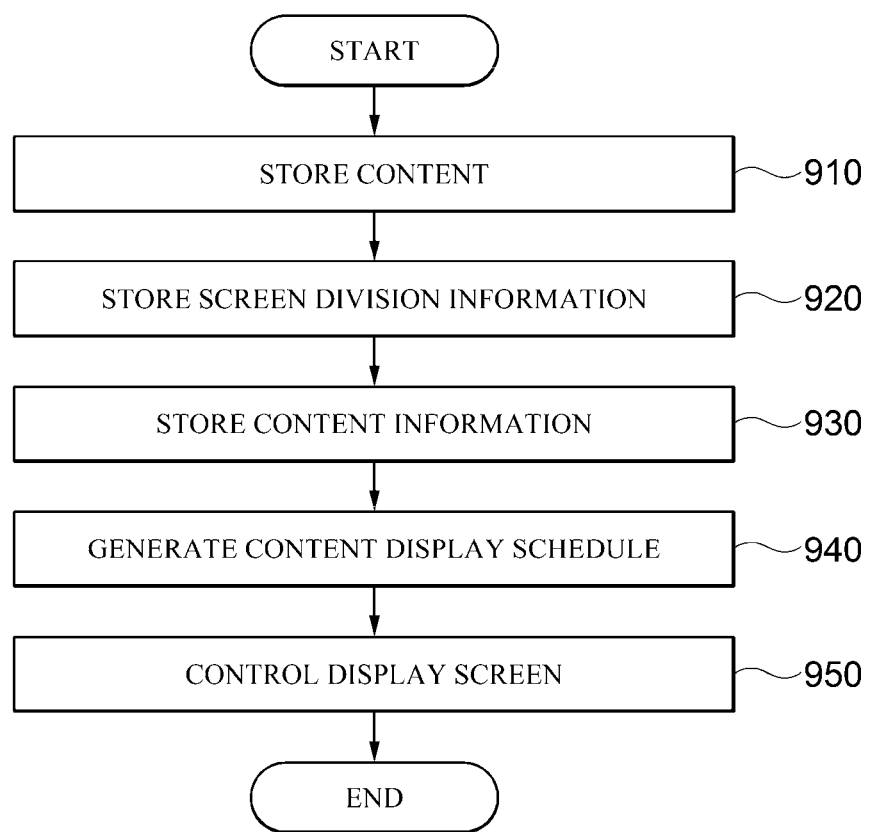
FIG. 9 is a flowchart showing a content scheduling method according to an embodiment.

FIG. 9 is a flowchart showing a content scheduling method according to an embodiment. The content scheduling method illustrated in FIG. 9 may be performed by the content scheduling apparatus 100 illustrated in FIG. 1. In the illustrated flowchart, the method is described by being divided into a plurality of divided operations, but at least some of the operations may be performed in a reverse order, concurrently performed in combination with other operations, omitted, sub-divided, or one or more additional operations which are not illustrated may be performed.

First, the content storage 110 stores plurality of contents (910). The content refers to digital information that may be displayed by a display screen and may be, for example, advertising content, movie content, music content, and the like. However, the present invention is not limited thereto, and the content may include video content as well as image content.

Next, the screen division information storage 120 stores screen division information (920). The screen division information includes information about a plurality of screen division forms including different respective division regions, time slots allocated to each of the division regions included in each of the plurality of screen division forms, a switching order between the plurality of screen division forms, and display duration of each of the plurality of screen division forms. A time slot refers to a time interval for which a single piece of content is displayed in each division region, and the time interval may vary according to a user's setting.

Next, the content information storage 130 stores content information (930). The content information may include content list information including a list of contents to be displayed in each division region among the plurality of contents and content display order information including a display order of contents to be displayed in each division region.

Finally, the schedule generator 140 generates a content display schedule by allocating the plurality of contents to the time slots allocated to each division region based on the screen division information and the content information (940). In detail, the schedule generator 140 allocates the plurality of contents to the time slots allocated to each of the division regions based on the time slot information and the content list information included in the screen division information and the content information, respectively, in a sequence based on the content display order information included in the content information.

The schedule generator 140 checks the time slot information and the content list information and allocates the plurality of contents to the time slots allocated to each division region such that the plurality of contents are sequentially allocated to the time slots based on the content display order information. When the number of the plurality of contents to be displayed in a specific division region among the respective division regions is less than the number of the time slots allocated to the specific division region, the schedule generator 140 may sequentially and repeatedly allocate the plurality of contents to be displayed in the specific division region to the time slots allocated to the specific division region.

Meanwhile, the display controller 150 may control the display screen to be divided based on the screen division information and control the plurality of contents to be displayed in each division region based on the content display schedule (950).

Figure 10:
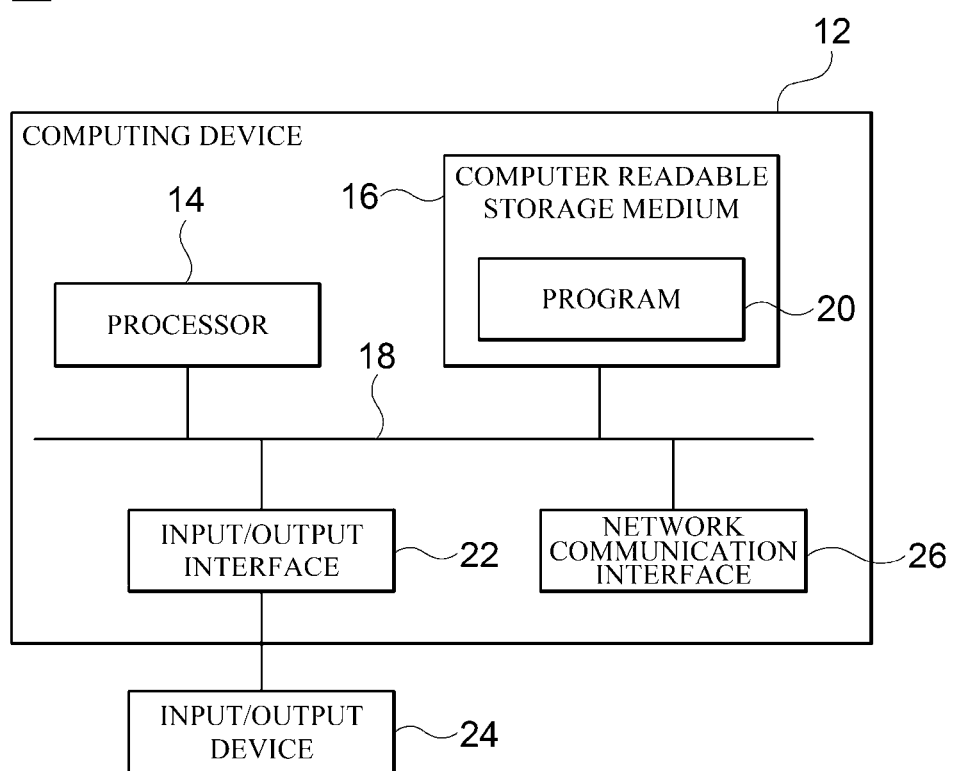
FIG. 10 is a block diagram for exemplarily describing a computing environment including a computing device suitable for the embodiments.

FIG. 10 is a block diagram for exemplarily describing a computing environment 10 including a computing device suitable for the embodiments.

In the illustrated embodiment, each component may have different functions and capabilities in addition to those described below and may include additional components in addition to those described below.

The computing environment 10 includes a computing device 12. In one embodiment, the computing device 12 may be a content scheduling apparatus. The computing device 12 includes at least one processor 14, computer readable storage medium 16, and a communication bus 18. The processor 14 may allow the computing device 12 to operate according to the embodiments described above. For example, the processor 14 may execute one or more programs stored in the computer readable storage medium 16. The one or more programs may include one or more computer executable instructions, and the computer executable instructions may allow the computing device 12 to perform operations according to the embodiment when executed by the processor 14.

The computer readable storage medium 16 stores computer executable instructions or program codes, program data and/or other suitable forms of information. The programs 20 stored in the computer readable storage medium 16 include a set of instructions executable by the processor 14. In one embodiment, the computer readable storage medium 16 includes a memory (a volatile memory, such as a random access memory, a nonvolatile memory, or a suitable combination thereof), one or more magnetic disk storage devices, optical disk storage devices, flash memory devices, or any other form of storage medium accessible by the computing device 12 and capable of storing desired information, or a suitable combination thereof.

The communication bus 18 interconnects various other components of the computing device 12 including the processor 14 and the computer readable storage medium 16.

The computing device 12 may also include one or more input/output interfaces 22 that provide an interface for one or more input/output devices 24 and one or more network communication interfaces 26. The input/output interface 22 may be connected to the network communication interface via the communication bus 18. The input/output device 24 may be connected to other components of the computing device 12 via the input/output interface 22. The input/output device 24 may include an input device, such as a pointing device (e.g., a mouse, a trackpad, or the like), a keyboard, a touch input device (e.g., a touchpad, a touchscreen, or the like), a speech or sound input device, various types of sensor devices, and/or imaging devices, and an output device such as display devices, printers, speakers, and/or network cards. The input/output device 24 may be included inside the computing device 12 as one component forming the computing device 12 and may be connected to the computing device 12 as a separate device distinguished from the computing device 12.

The above description should be regarded as illustrative rather than restrictive in all aspects. The scope of the present invention is to be determined by reasonable interpretation of the accompanying claims, and the present invention covers all changes or modifications provided they come within the scope of the present invention and the equivalents.

The invention claimed is:

1. A content scheduling apparatus comprising:
a content storage comprising a non-transitory computer-readable medium configured to store a plurality of contents;
a screen division information storage configured to store screen division information comprising a plurality of screen division forms each comprising division regions divided from an area of a display screen, and to store time slot information comprising information about time slots allocated to each of the division regions included in each of the plurality of screen division forms;
a content information storage configured to store content information comprising content list information about a list in which contents to be displayed are listed for each of the division regions among the plurality of contents and content display order information comprising display orders each of which includes a display order of the contents listed foreach of the division regions;
and one or more hardware processors configured to allocate the plurality of contents to the time slots allocated to each of the division regions, based on the screen division information and the content information to generate a content display schedule, wherein, when the number of the contents listed for a specific division region among the division regions is less than the number of the time slots allocated to the specific division region, the one or more hardware processors are further configured to:

allocate the contents listed for the specific division region to the time slots allocated to the specific division region sequentially and repeatedly according to the display order of the contents listed for the specific division region; or allocate the contents listed for the specific division region to the time slots allocated to the specific division region according to the display order of the contents listed for the specific division region and to allocate a predetermined default content to a time slot to which no content is allocated.

2. The content scheduling apparatus of claim 1, wherein the screen division information further comprises information about an order of switching between the plurality of screen division forms and display duration of each of the plurality of screen division forms.

3. The content scheduling apparatus of claim 2, wherein the one or more hardware processors are further configured to control the display screen to be divided based on the screen division information and control the plurality of contents to be displayed in the respective division regions based on the content display schedule.

4. A content scheduling method performed by a content scheduling apparatus, comprising:

storing plurality of contents;

storing screen division information comprising a plurality of screen division forms each comprising different respective division regions divided from an area of a display screen and time slot information comprising information about time slots allocated to each of the division regions included in each of the plurality of screen division forms;

storing content information comprising content list information comprising a list in which contents to be displayed are listed for each of the division regions among the plurality of contents and content display order information comprising display orders each of which includes a display order of the contents listed for each of the division regions; and allocating the plurality of contents to the time slots allocated to each of the division regions, based on the screen division information and the content information to generate a content display schedule, wherein, when the number of the contents to be displayed in a specific division region among the division regions is less than the number of the time slots allocated to the specific division region, the generating of the content display schedule comprises:

sequentially and repeatedly allocating the contents listed for the specific division region to the time slots allocated to the specific division region according to the display order of the contents listed for the specific division region; or allocating the contents listed for the specific division region to the time slots allocated to the specific division region and allocating a predetermined default content to a time slot to which no content is allocated.

5. The content scheduling method of claim 4, wherein the screen division information further comprises information about an order of switching between the plurality of screen division forms and display duration of each of the plurality of screen division forms.

6. The content scheduling method of claim 5, further comprising controlling the display screen to be divided based on the screen division information and controlling the plurality of contents to be displayed in the respective division regions based on the content display schedule.

7. A content scheduling apparatus comprising:

a content storage comprising a non-transitory computer-readable medium configured to store a plurality of contents;

a screen division information storage configured to store screen division information comprising a screen division form having division regions divided from an area of a display screen, and to store time slot information comprising information about time slots allocated to each of the division regions;

a content information storage configured to store content information comprising content list information about a list in which contents to be displayed are listed for each of the division regions among the plurality of contents and content display order information comprising display orders each of which includes a display order of the contents listed for each of the division regions; and one or more hardware processors configured to allocate the contents listed for each of the division regions to the time slots allocated to each of the division regions according to the content display order information so that the contents listed for each of the division regions are sequentially displayed on each of the division regions, wherein, when the number of the contents listed for at least one of the division regions is less than the number of the time slots allocated to the at least one of the division regions, the one or more hardware processors are further configured to:

allocate the contents listed for the at least one of the division regions to the time slots allocated to the at least one of the division regions according to the display order of the contents listed for the at least one of the division regions, and to allocate repeatedly the contents listed for the at least one of division regions to a time slot to which no content is allocated; or allocate the contents listed for the at least one of the division regions to the time slots allocated to the at least one of the division regions according to the display order of the contents listed for the at least one of the division regions, and to allocate a predetermined default content to a time slot to which no content is allocate.

8. The content scheduling apparatus of claim 7, wherein the screen division form information comprises a plurality of screen division forms; and the screen division form information further comprises information about an order of switching between the plurality of screen division forms and display duration of each of the plurality of screen division forms.

9. The content scheduling apparatus of claim 7, wherein the one or more hardware processors are further configured to control the display screen to be divided based on the screen division information and control the plurality of contents to be displayed in the respective division regions based on the content display schedule.

* * * * *